(12) United States Patent
Morovic et al.

(10) Patent No.: US 10,832,106 B2
(45) Date of Patent: Nov. 10, 2020

(54) COMBINING LOOKUP TABLES

(71) Applicant: HEWLETT-PACKARD DEVELOPMENT COMPANY, L.P., Spring, TX (US)

(72) Inventors: Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/477,867

(22) PCT Filed: Apr. 20, 2017

(86) PCT No.: PCT/US2017/028615
§ 371 (c)(1),
(2) Date: Jul. 12, 2019

(87) PCT Pub. No.: WO2018/194618
PCT Pub. Date: Oct. 25, 2018

(65) Prior Publication Data
US 2020/0125904 A1    Apr. 23, 2020

(51) Int. Cl.
*G06K 15/00* (2006.01)
*G06K 15/02* (2006.01)

(52) U.S. Cl.
CPC ..... *G06K 15/1878* (2013.01); *G06K 15/1881* (2013.01)

(58) Field of Classification Search
None
See application file for complete search history.

(56) References Cited

U.S. PATENT DOCUMENTS

| 5,483,360 | A | * | 1/1996 | Rolleston | H04N 1/40006 |
| | | | | | 358/501 |
| 5,530,656 | A | | 6/1996 | Six | |
| 6,232,954 | B1 | | 5/2001 | Rozzi | |
| 8,786,625 | B2 | | 7/2014 | Cote et al. | |
| 9,756,221 | B2 | * | 9/2017 | Morovic | H04N 1/00082 |
| 2002/0149546 | A1 | | 10/2002 | Moshe | |
| 2004/0113978 | A1 | * | 6/2004 | Huang | B41J 2/2121 |
| | | | | | 347/43 |
| 2007/0291312 | A1 | | 12/2007 | Nao | |
| 2008/0151333 | A1 | | 6/2008 | Monga et al. | |
| 2009/0067007 | A1 | | 3/2009 | Ishida | |

(Continued)

FOREIGN PATENT DOCUMENTS

| WO | WO-2007137621 A1 | 12/2007 | |
| WO | WO-2014173474 A1 | 10/2014 | |
| WO | WO-2015161895 A1 * | 10/2015 | .......... H04N 1/6058 |

OTHER PUBLICATIONS

"Color Setting Printer"; Dec. 4, 2016; http://www.color-management-guide.com/photoshop-color-settings.html.

*Primary Examiner* — Dung D Tran
(74) *Attorney, Agent, or Firm* — HP Inc. Patent Department

(57) ABSTRACT

A method is disclosed in which a lookup table (LUT) that maps chromatic and achromatic device color space vectors into Neugebauer primary area coverages (NPacs) is obtained. According to the method, a LUT that maps chromatic device color space vectors into NPacs is combined with a LUT that maps achromatic device color space vectors into NPacs.

17 Claims, 8 Drawing Sheets

(56) References Cited

U.S. PATENT DOCUMENTS

| | | |
|---|---|---|
| 2010/0033737 A1 | 2/2010 | Park et al. |
| 2010/0054769 A1 | 3/2010 | Adiletta et al. |
| 2016/0057314 A1* | 2/2016 | Morovic ............ H04N 1/6025 |
| | | 358/3.23 |
| 2017/0048420 A1* | 2/2017 | Morovic ............ H04N 1/6019 |
| 2019/0089867 A1* | 3/2019 | Morovic ........... H04N 1/00023 |

* cited by examiner

COMBINING LOOKUP TABLES

BACKGROUND

A printing system using a probability-space image processing pipeline, such as the Halftone Area Neugebauer Separation (HANS) pipeline, may output a printed image. Lookup tables (LUTs) may permit to transform color data expressed in terms of device color space vectors into area coverages, such as Neugebauer Primary area coverages (NPacs).

DETAILED DESCRIPTION

Figure 1:
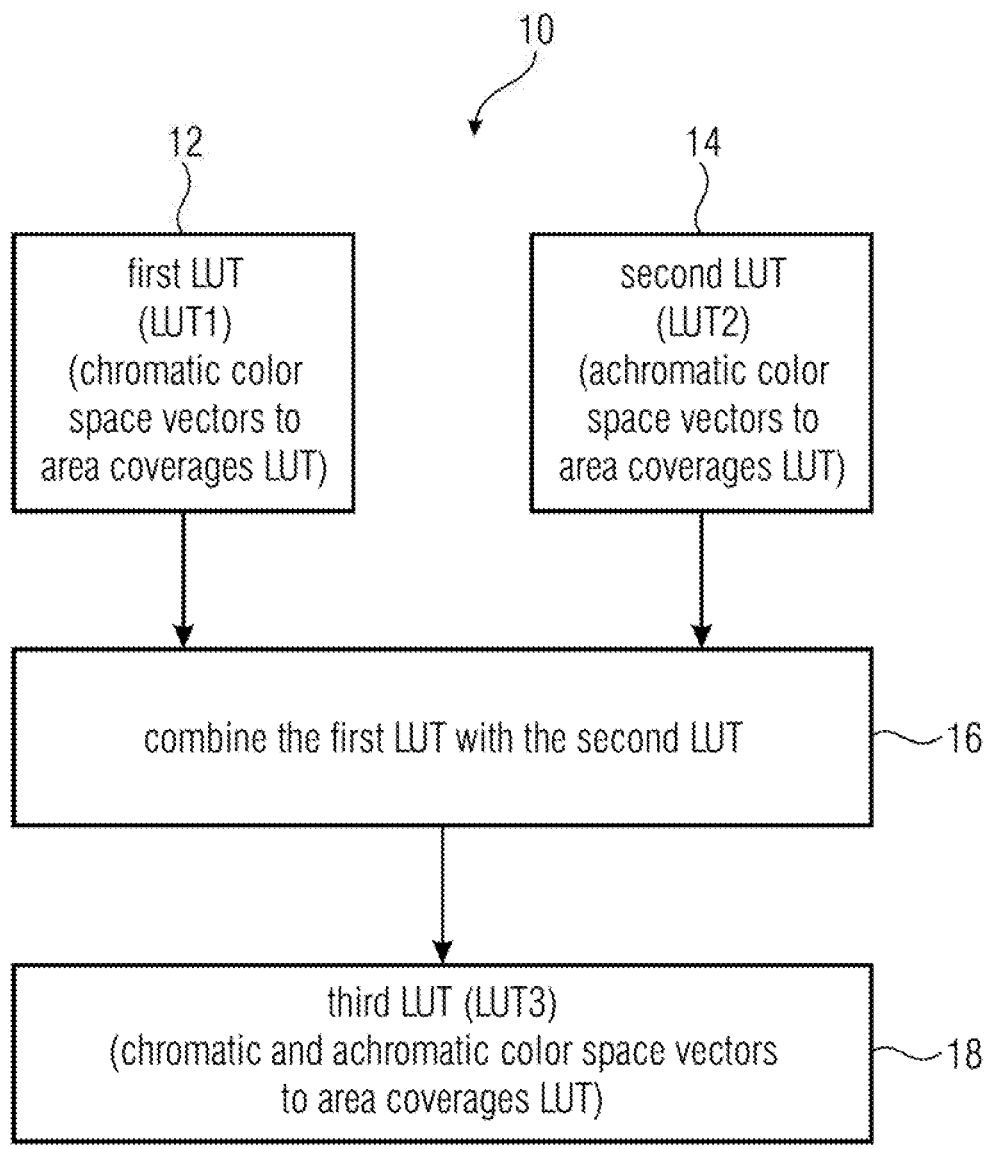
FIG. 1 shows a schematic diagram illustrating a method according to an example.

Hereinafter, examples are directed to printing systems and methods, e.g., using ink-jet printers, laser printers, xerographic printers, three-dimensional (3D) printers or other printers.

Print permits to represent images to human eye or obtain objects. Print may be bi-dimensional (2D) print or three-dimensional (3D) print. 2D print may be the result of a number of chromatic or achromatic colorants disposed on top of a substrate, e.g., paper. Colorant, e.g., ink amounts are chosen for generating elements, e.g., dots of a print job. With 3D print, a three-dimensional object may be obtained by ejecting build material on a bed of build material. A printing system may include a printer, which may be a 2D printer or a 3D printer. In certain cases, the printer may be an inkjet printer, for example a scanning inkjet printer or a page wide array printer. Other examples of printers may include laser printers, print presses, xerographic printers, and electrophotographic printers.

A colorant is a print material, e.g., ink, toner, fluid, varnish, build material, etc. The colorant may also be defined with reference to a color space, which comprises the colors that may be obtained by a particular printer. A colorant may be defined with reference to a particular representation model, such as Red-Green-Blue (RGB) color space, Cyan-Magenta-Yellow (CMY) color space, or Cyan-Magenta-Yellow-Black (CMYK) color space. Chromatic colorants, e.g., Red, Green, Blue, Cyan, Magenta, Yellow, Orange, Violet. and so on, may be distinguished from achromatic colorants, e.g., Black. Grey.

A printing system or method may rely on hardware equipment operating according to a sequence of passages forming a pipeline.

With a colorant space image processing pipeline, computations are performed on values, e.g., expressed in terms of quantities of RGB, CMY, or CMYK, associated to colorants to be deposited onto a substrate.

An original image data may comprise color data represented in a color space, e.g., RGB, CMY, CMYK, etc., in which chromatic and achromatic color values are associated to quantities of colorants. It is possible to define, for each pixel of an image, a vector with a multiplicity of components, e.g., three components in RGB and CMY color space and four components in a CMYK color space.

With a probability space image processing pipeline, such as the Halftone Area Neugebauer Separation (HANS) pipeline, colorants and colorant combinations to be deposited are treated in terms of probabilities, such as statistical distributions of color states. At the end of the pipeline, a selection process, e.g., halftoning, may establish the color that is to be actually deposited on the substrate using the probabilities defined in the NPac associated to each pixel.

The color data of a device color space may be mapped to a Neugebauer Primary area coverage (NPac) color space, so that a resulting image comprises pixels whose color values are defined in terms of NPac vectors that specify probability values for different halftone pixel states. An image on a substrate comprises a plurality of pixels or dots. Each pixel may be associated to a particular vector of probabilities. Each component of the vector may be a colorant or a combination of colorants, also referred to as a Neugebauer primary, NP, which may be applied to a pixel. An image to be printed may be represented as a matrix of pixels, each associated to a NPac vector, each NPac vector, in its components, mapping the probability of the NPs.

In a bi-level color system, e.g., a printer which produces at maximum one single drop for each colorant in a pixel, a NP may be one of $2^N$ combinations of N colorants within the printing system. If a printing device uses Cyan Magenta Yellow, CMY, colorants, $2^3=8$ NPs are defined: C, M, Y, CM, CY, MY, CMY, and W. e.g., Blank or White, indicating an absence of colorant, i.e. the color state of the substrate, which may be White in some examples. If a printing device is capable of applying two levels of CMY colorants for each pixel, a NP may be one of $(2+1)^3=27$ combinations of colorants. Two levels of CMYK colorants may generate $(2+1)^4=81$ NPs.

If a pixel is to be Magenta, the corresponding NPac is such that the probability associated to Magenta is 1, i.e., 100% of probability, while the probabilities associated to different NPs in the same NPac are 0. The NPac therefore may be: {$NPac_C=0$, $NPac_M=1$, $NPac_Y=0$, $NPac_{CM}=0$, $NPac_{CY}=0$, $NPac_{MY}=0$, $NPac_{CMY}=0$. $NPao_W=0$}. However, if a pixel is to have a color intermediate to the color values of two NPs, e.g., a value intermediate between CM and CY, in the NPac the components associated to the two NPs may have values of 0.5 each, while the components associated to different NPs may be 0, e.g., {$NPac_C=0$, $NPac_M=0$. $NPac_Y=0$, $NPac_{CM}=0.5$, $NPac_{CMY}=0.5$, $NPac_W=0$, $NPac_{CMY}=0$, $NPac_W=0$}. Notably, the sum of the values of each NPac is 1: this result is obtained in view of the fact that the probabilities cover the 100% of possible color states of a pixel.

When an image defined in a color space, e.g., RGB is to be printed using a HANS pipeline, the color value of each pixel of an image to be printed may be mapped into an area coverage (NPac). Lookup tables (LUTs) may map color space vectors into NPacs. For example, using the components of each device color vector, it is possible to define a NPac vector by referring to values stored in the LUT. For example, a LUT may map the device color vector {C=0.5. M=0.25, Y=0.25} to the NPac {$NPac_C=0.4$. $NPac_M=0.15$, $NPac_Y=0.15$, $NPac_{CM}=0$, $NPac_{CY}=0$, $NPac_{MY}=0$, $NPac_{CMY}=0.1$, $NPac_W=0.2$}. A LUT may be represented as a matrix of N dimensions, N being the number of color values of the color space, each element of the matrix comprising a coverage area vector (NPac).

The construction of a device color space to a NPac LUT may be performed by defining, e.g., manually, by a user, correspondences between device color vectors and NPac vectors and, subsequently, populating, e.g., using interpolations or other techniques, e.g., automatic techniques, the values for the remaining entries of a LUT. For example, some correspondences, e.g., in entries positioned at extremities of the matrix, may be chosen by a user. In addition or instead, some correspondences may be chosen, by a user, in entries which are in internal positions of the matrix. The correspondences chosen by a user may be defined as anchors: in the subsequent passage of populating the values for the remaining entries, the anchors are unchanged. Automatic techniques for populating a LUT using anchors may comprise, for example, linear interpolations or other kinds of interpolations. In some cases, the initial correspondences, also referred to as anchors, may be automatically selected and some of them may refer to nodes placed at the extremities of the LUT.

It is in general not easy to control achromatic colorants and chromatic colorants in the same LUT. For example, a LUT mapping CMYK values into NPacs may be obtained using two transformations in cascade: a first transformation from CMYK to RGB, and a second transformation from RGB to NPacs. What is obtained is a transformation which virtually maps CMYK values into NPacs. However, changes at the inputs of the first transformations may not correspond to changes at the output of the second transformation. The direct control of the achromatic colorants is therefore not enabled.

FIG. 1 shows a method 10. The method 10 may operate on a first LUT 12. The first LUT 12 may be a LUT, e.g. LUT1, mapping chromatic device color space vectors, e.g., RGB or CMY, into NPacs. The method 10 may operate on a second LUT 14, e.g., LUT2. The second LUT 14 may be a LUT mapping achromatic device color space vectors, e.g., Black, into NPacs. The method 10 may comprise a block 16 for combining the first LUT 12 with the second LUT 14 to obtain a third LUT 18 which maps chromatic and achromatic color space vectors into NPacs. Accordingly, a cascade combination may be avoided.

The block 16 may perform an element by element combination between output values (NPacs) of the first and second LUTs. For example, a convex combination, e.g., with equal weights, may be performed. The output values of the first and second LUTs may be interpolated to obtain an output value of the third LUT. An average, e.g., a weighted or arithmetic average, between the values of each component of the NPac vectors of the first and second LUTs may be obtained.

For example, using the first LUT, e.g., LUT1, having output values expressed as vectors $NPac_{LUT1}$, each having components $NPac_{LUT1,i}$, and the second LUT, e.g., LUT2, having output values expressed as vectors $NPac_{LUT2}$, each having components $NPac_{LUT2,i}$, the output, e.g., the third LUT. e.g. LUT3, may be, for each I-th component:

$$NPac_{LUT3,i}=(\alpha_1 NPac_{LUT1,i}+\alpha_2 NPac_{LUT2,i})/(\alpha_1+\alpha_2)$$

where $\alpha_1$ and $\alpha_2$ may be chosen as weights, e.g., under $\alpha_1+\alpha_2=1$.

In some examples, it is possible to choose $\alpha_1=\alpha_2=1/2$, to give the same weight to each LUT. In that case, it follows that the probability of each NP of each NPacs of the third LUT is the arithmetic average between the probabilities of the first and second LUTs, i.e.:

$$NPac_{LUT3,i}=(NPac_{LUT1,i}+NPac_{LUT2,i})/2$$

In some examples, it is possible to differentiate the weights. For example, $a_2$, which is the weight to be applied to the second LUT, LUT2, may be set as being greater than $\alpha_1$, which is the weight to be applied to the first LUT, LUT1, to give more weight to the achromatic values. For example, it may be possible to set $\alpha_1=0.2$ and $\alpha_2=0.8$.

An example is here discussed when the first LUT, e.g., LUT1, RGB or CMY to NPacs, provides, as an output, the NPac vector ($NPac_{LUT1,C}=0.4$, $NPac_{LUT1,CM}=0.2$, $NPac_{LUT1,W}=0.4$), i.e., 40% of probability of being Cyan, 20% of being Cyan superposed with Magenta and 40% of probability of being left Blank, while the second LUT 14, e.g., LUT2, K to NPacs, provides, as an output, {$NPac_{LUT2,K}=0.5$, $NPac_{LUT2,W}=0.5$}, i.e., 50% of probability of being Black and 50% of being left Blank. At block 16, these output values may be combined to each other, e.g., for each NP, to obtain values for the third LUT such as:

$$NPac_{LUT3,C}=(NPac_{LUT1,C}+NPac_{LUT2,C})/2=(0.4+0)/2=0.2$$

$$NPac_{LUT3,CM}=(NPac_{LUT1,CM}+Pac_{LUT2,CM})/2=(0.2+0)/2=0.1$$

$$NPac_{LUT3,W}=(NPac_{LUT1,W}+Pac_{LUT2,W})/2=(0.4+0.5)/2=0.45$$

$$NPac_{LUT3,K}=(NPac_{LUT1,K}+Pac_{LUT2,K})/2=(0+0.5)/2=0.25$$

The resulting pixel has 20% of probability of being Cyan, 10% of probability of being Cyan superposed with Magenta, 45% of being left Blank, and 25% of being Black.

The resulting third LUT 18 has dimensions, in this case, e.g., four dimensions, which may derive from the dimensions of the first LUT 12, e.g., three in case of RGB or CMY to NPacs, and the dimensions of the second LUT 14, e.g., one in case of W to NPacs.

As the LUT1 refers to chromatic values and the LUT2 refers to achromatic values, for the general i-th chromatic component and for the general j-th achromatic component under the hypothesis of $\alpha_1=\alpha_2=1/2$:

$$NPac_{LUT3,Chomatic\_value,i}=NPac_{LUT1,Chomatic\_value,i}/2$$

$$NPac_{LUT3,Achomatic\_value,j}=NPac_{LUT2,Achomatic\_value,j}/2$$

$$NPac_{LUT3,W}=(NPac_{LUT1,W}+NPac_{LUT2,W})/2$$

Figure 2:
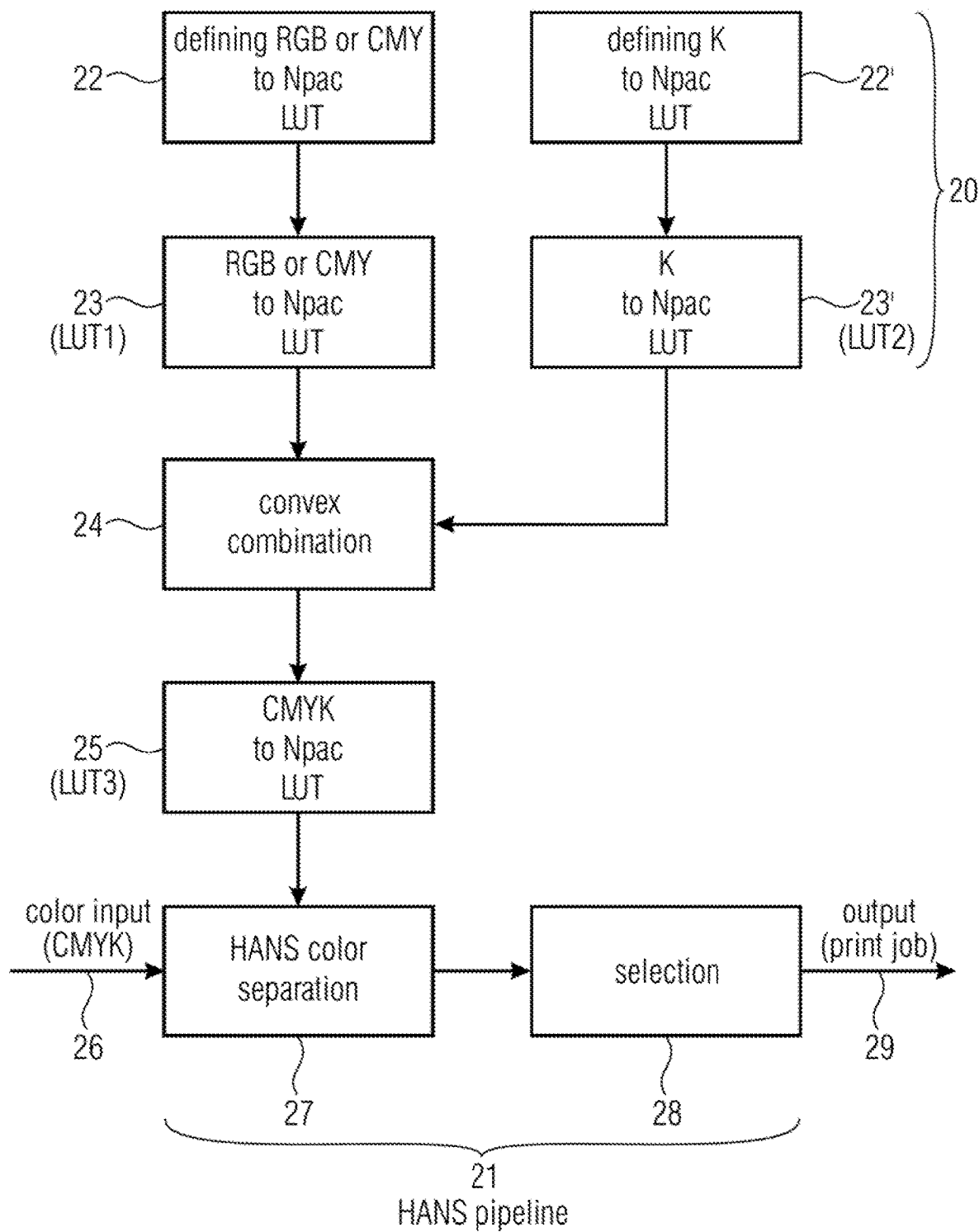
FIG. 2 shows a schematic diagram illustrating a method according to an example.

FIG. 2 shows a method 20. The method 20 may permit to create a LUT, e.g., LUT3 which maps chromatic and achromatic device color space vectors. e.g., CMYK into NPacs.

The method 20 may provide a block 22. The block 22 may comprise creating a first LUT, e.g., LUT1, here indicated with 23, which maps chromatic device color space vectors, e.g., CMY, RGB, into NPacs. The block 22 may include defining correspondences between chromatic states, e.g., RGB or CMY vectors and NPacs. For example, the vector {$NPac_{LUT1,C}=0.4$, $NPac_{LUT1,CM}=0.2$, $NPac_{LUT,W}=0.4$} may be an output of the LUT1 to indicate 40% of probability for Cyan, 20% for Cyan superposed with Magenta, and 40% of probability for Blank.

The method 20 may provide a block 22'. The block 22' may comprise creating a second LUT, e.g., LUT2, here indicated with 23' which maps achromatic device color space vectors, e.g., K, into NPacs. The block 22' may include defining correspondences between achromatic states, e.g., Grey levels, and NPacs. For example, the vector {NPac$_{LUT2,K}$=0.5, NPac$_{LUT2,W}$=0.5} may be an output value in the LUT2 in to indicate 50% of probability for Black and 50% for Blank.

The blocks 22 and/or 22' may comprise defining correspondences, also referred to as anchors, e.g., manually, using a selection of a user, e.g., a color engineer or printer operator. For example, the user may define that a given chromatic vector {M$_0$, C$_0$, Y$_0$} may correspond to a given NPac vector {NPac$_{C0}$, NPac$_{M0}$, NPac$_{Y0}$, NPac$_{CM0}$, NPac$_{CY0}$, NPac$_{MY0}$, NPac$_{CMY0}$, NPac$_{W0}$} of the first LUT, e.g., LUT1. The user may define that a given achromatic vector {K$_0$, W$_0$} corresponds to a given NPac such as {NPac$_{K0}$, NPac$_{W0}$}. After having defined a plurality of correspondences, e.g., anchors, it is possible to automatically define values for the other entries of the LUT. e.g., by interpolating the values associated to the anchors or by populating the remaining entries of the LUT using functions obeying to the anchors.

The user may, using his/her experience and/or using a configuration tool, perform trials using different correspondences. Trial images may be generated, e.g., printed. A user may choose a first LUT mapping chromatic device color space vectors into NPacs according to his/her preference or judgment and a second LUT mapping achromatic device color space vectors into NPacs according to his/her preference or judgment.

The blocks 22 and 22' may comprise performing combinations, e.g., convex combinations such as linear combinations, between different chromatic or achromatic device color space vectors. For example, it is possible to convert CMY values into RGB values, e.g., using a conversion according to which R=1−C, G=1−M, and B=1−Y. Such an operation may be performed where it is indented to use the first LUT1 as a LUT mapping RGB color space vectors into NPacs but the user selects the correspondences in the CMY device color space.

The method may comprise a block 24, in which a third LUT, e.g., LUT3, indicated with 25, mapping chromatic and achromatic device color space vectors, e.g., CMYK Into NPacs is created using the first LUT 23, e.g., LUT1, and a second LUT 23', e.g. LUT2. The block 24 may be carried out, for example, by performing the operations set out at block 16. The block 24 may make use of a convex combination, e.g., linear interpolation, between elements of the first LUT, e.g., LUT1, and the second LUT, e.g., LUT2.

At 24 it is for example possible to perform the above-discussed convex combination between the NPac vector {NPac$_{LUT1,C}$=0.4. NPac$_{LUT1,CM}$=0.2, NPac$_{LUT1,W}$=0.4} and the NPac vector {NPac$_{LUT2,K}$=0.5, NPac$_{LUT2,W}$=0.5}, to obtain the NPac vector {NPa$_{LUT3,C}$=0.2, NPac$_{LUT3,CM}$=0.1, NPac$_{LUT2,K}$=0.2, NPac$_{LUT3,W}$=0.45}.

After having being generated, the third LUT 25, e.g., LUT3, may be stored in a storage unit, e.g., a non-volatile storage unit, which may be used for performing a print.

A print operation is now described with reference to the HANS pipeline 21. The HANS pipeline.

At block 27, HANS color separation is performed, e.g., by mapping the input values, e.g., CMYK, of the input 26 into NPacs using the third LUT 25, e.g., LUT3.

Subsequently, at block 28, a selection process of determining the colorant to be actually used to generate each pixel is performed using probability values associated to each NP. The block 28 may comprise, inter alia, a halftoning procedure, which may perform, for example, dithering, error diffusion, or matrix halftoning. Accordingly, an output 29, e.g., a print job, may be generated.

Figure 3B:
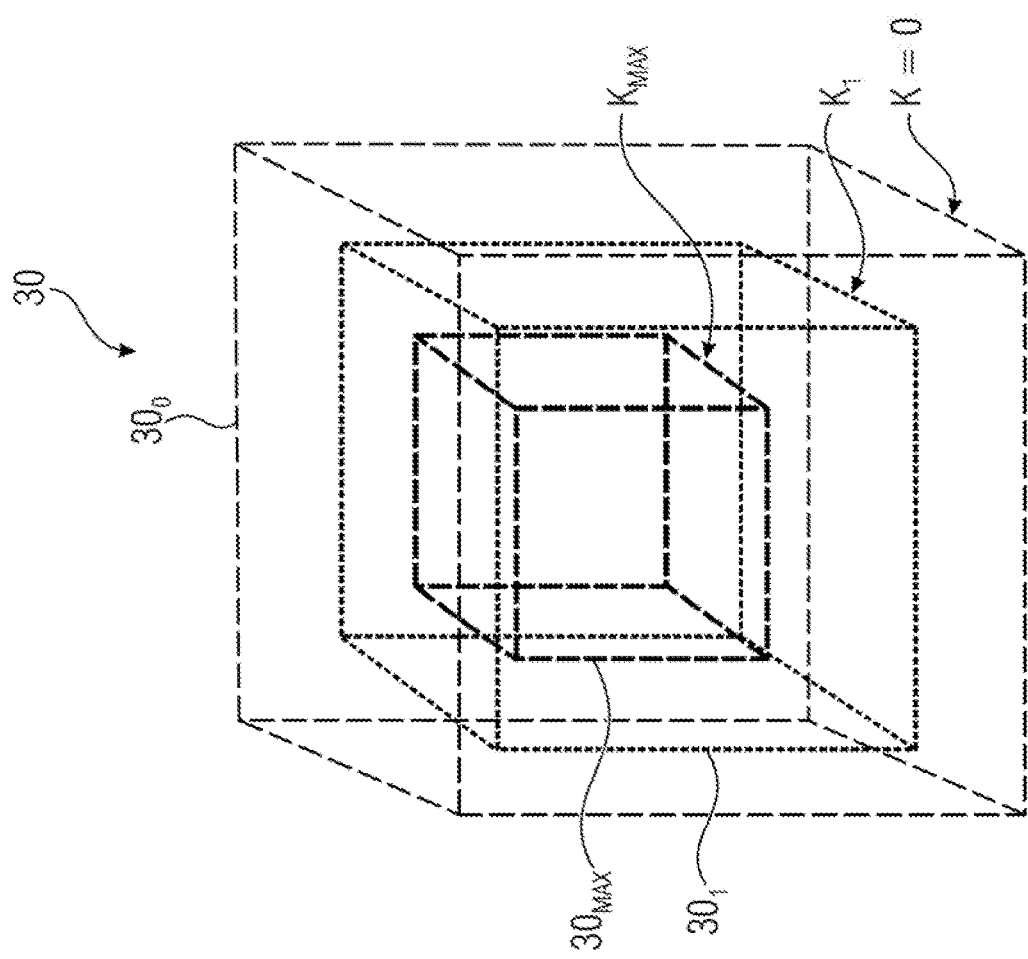
FIGS. 3a and 3b show representations of LUTs according to examples.
Figure 3A:
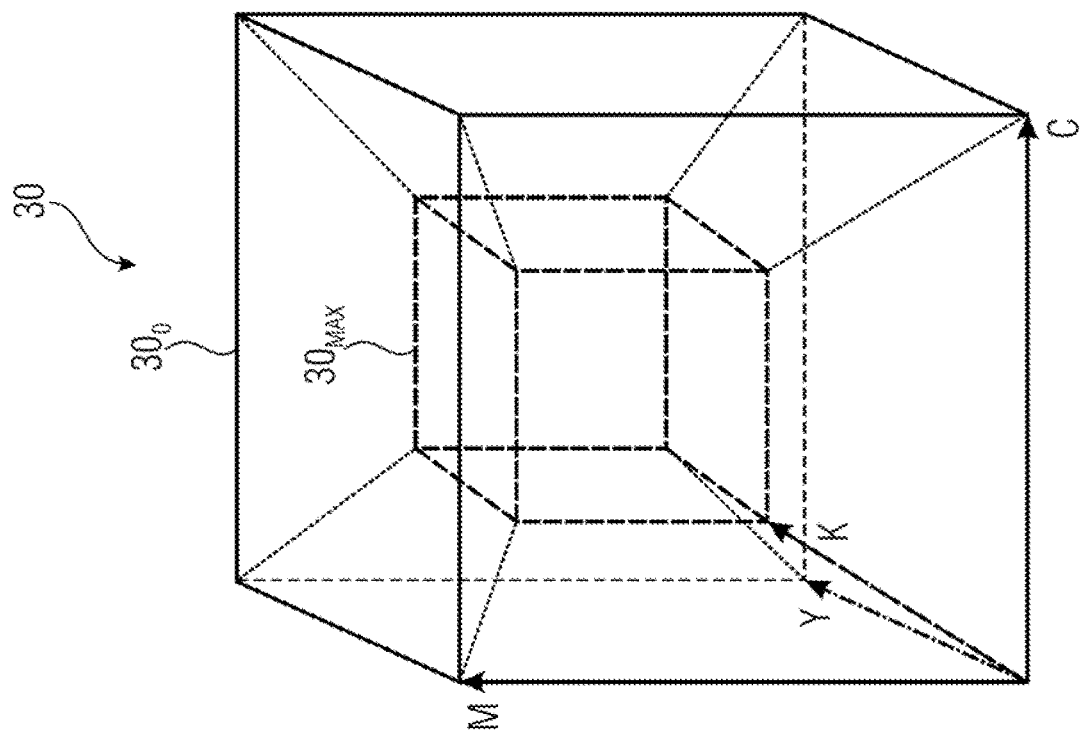

FIGS. 3a and 3b show a representation 30 of a 4-dimensional LUT, e.g., the third LUT, mapping CMYK vectors into NPac vectors. While the axes C, M, Y are associated to different chromatic color values in the CMY space, the fourth dimension K is associated to K values, e.g., grey scale. Notably, cube or parallelepiped 30$_0$ refers to the situations in which K=0, i.e., no Black, while 30$_{MAX}$ refers to the situations in which K=K$_{MAX}$, i.e., the maximum Black level is applied. FIG. 3b also shows 30$_1$, K=K$_1$ intermediate between the cube 30$_{MAX}$, K=0, and the cube 30$_{MAX}$, K=K$_{MAX}$. The volume occupied by the cube 30$_{MAX}$ is internal to the volume occupied by 30$_0$.

Figure 4:
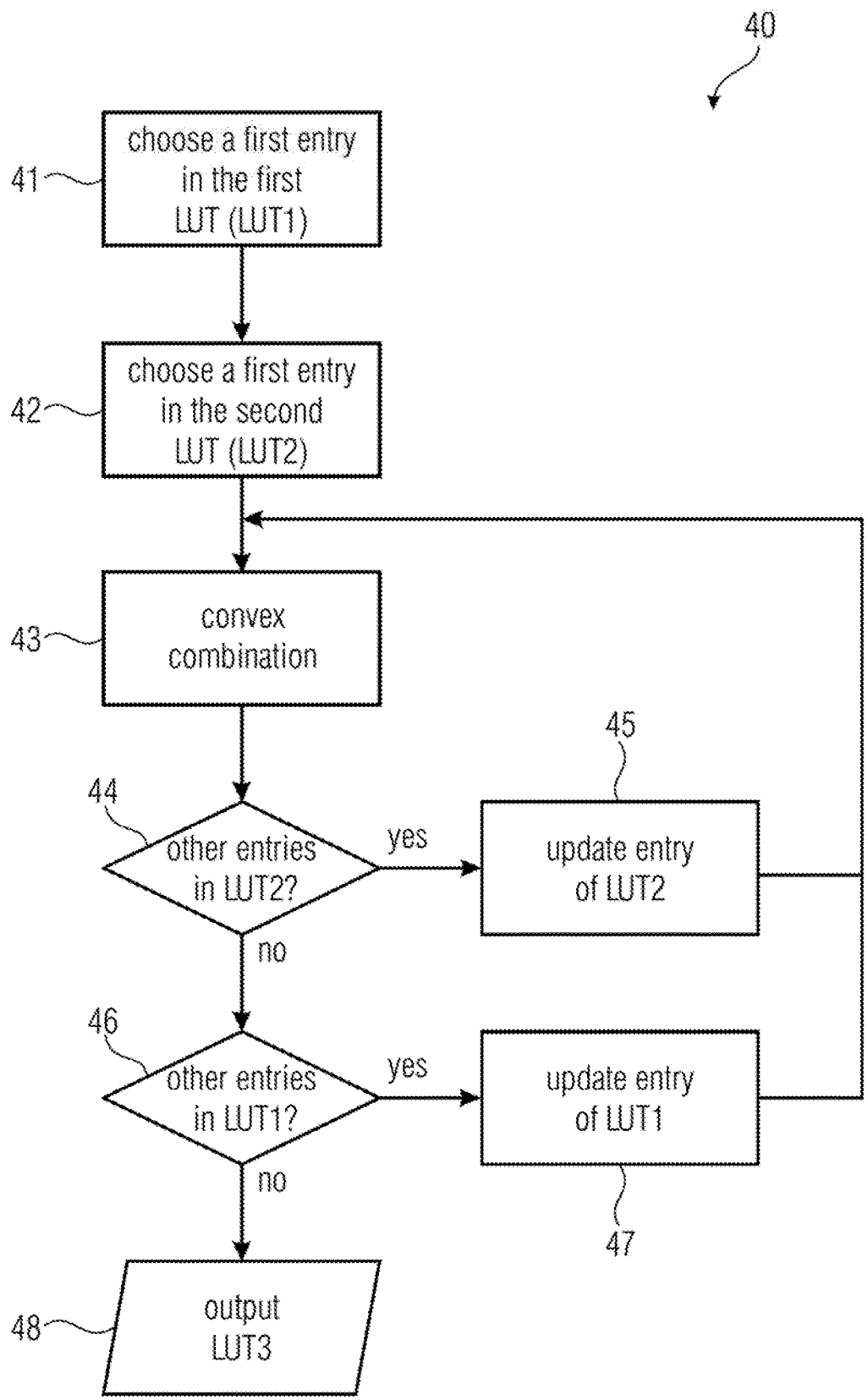
FIG. 4 shows a schematic diagram illustrating a method according to an example.

FIG. 4 shows a method 40. The method 40 may create a LUT, e.g., LUT3, mapping chromatic and achromatic device color space vectors into NPacs. The method 40 may be used to perform, for example, block 16 or block 24. The method 40 may make use of a first LUT, e.g., LUT1, which may be a LUT mapping chromatic device color space vectors, e.g., CMY, RGB, into NPacs. The method 40 may make use of a second LUT, e.g., LUT2, which may be a LUT mapping achromatic device color space vectors. e.g., K, into NPacs.

The method 40 may comprise iterative cycles, e.g., nested cycles, to perform a combination between all the entries of the first LUT, e.g. LUT1, and all the entries of the second LUT, e.g. LUT2. An internal iteration cycle may comprise blocks 43, 44, 45. The internal iteration cycle may cycle all the entries of one LUT, e.g., LUT2, while maintaining the same value for another LUT, e.g., LUT1. An external iteration cycle may comprise blocks 43, 46, 47. The external iteration cycle may cycle all the entries of one LUT, e.g., LUT1, while maintaining the same value for another LUT, e.g., LUT2. The LUT cycled in the external iteration cycle is in generate different form the LUT cycled in the external iteration cycle.

At block 41, a first entry of the first LUT, e.g. LUT1, may be chosen. The first entry of the first LUT may map a chromatic device color space vector into a NPac. At block 42, a first entry of the second LUT, e.g. LUT2, may be chosen. The first entry of the second LUT may map an achromatic device color space vector into a NPac. At block 43, a convex combination may be performed between the NPacs of the chosen entries. The block 43 may implement, for example, one of the blocks 16 and 24. Accordingly, a 4-dimensional vector (C, M, Y, K) may be associated to a NPac.

At block 44, it is checked if the entries of the second LUT have ended. If there are other entries of the second LUT that have to be associated to the current entry of the first LUT, then the entry of the second LUT is updated at block 45. Hence, the entry to be used for a subsequent cycle.

At block 46, it is checked if the entries of the first LUT have ended. If there are other entries of the first LUT to be associated to entries of the second LUT, then the entry of the first LUT is updated at block 45.

At the end of the internal and external cycles, a third LUT, e.g. LUT3, may be output at block 48. This third LUT maps chromatic and achromatic color space vectors into NPacs.

Figure 5:
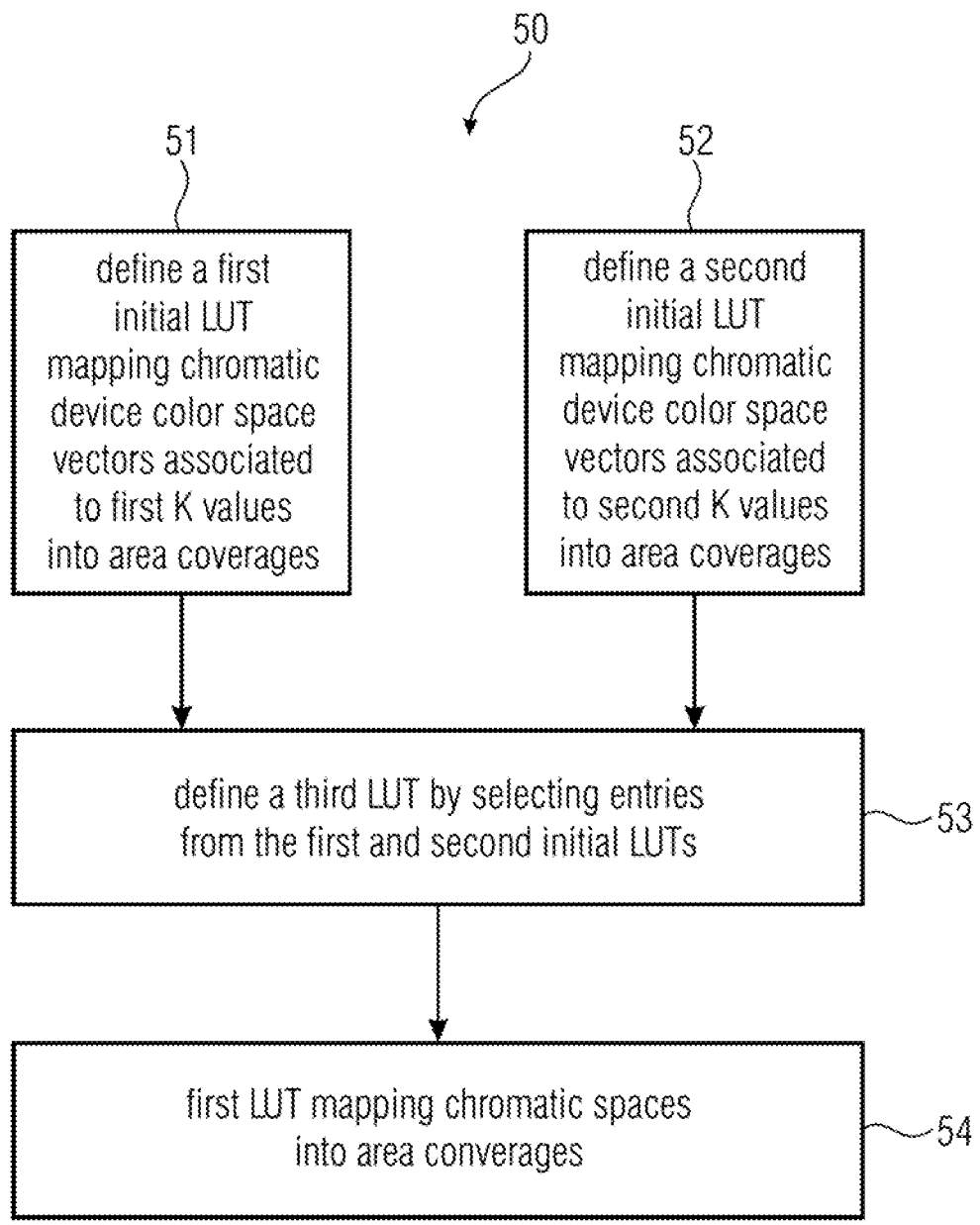
FIG. 5 shows a schematic diagram illustrating a method according to an example.

FIG. 5 shows a method 50. The method 50 may permit to create the first LUT, e.g., LUT1, from a first initial LUT and a second initial LUT. The first initial LUT may map chromatic device color space vectors into NPacs. The first initial LUT may be associated to first achromatic device color values, e.g., 0≤K<K$_1$. The second initial LUT may map chromatic device color space vectors into NPacs. The second initial LUT may be associated to second achromatic device color values, e.g., $K1 \leq K \leq K_{MAX}$. The first and second initial LUTs may be construed differently using different relationships between the device color space vectors and the NPacs. For example, the first initial LUT, which is to be associated to K values $0 \leq K < K_1$, may present lighter gradations than the second initial LUT, which is to be associated to K values $K1 \leq K \leq K_{MAX}$.

The method 50 may comprise, for example, a block 51 defining a first initial LUT mapping chromatic device color space vectors into NPacs. This first initial LUT may be associated to first K values. The method 50 may comprise, for example, a block 52 defining a second initial LUT mapping chromatic device color space vectors into NPacs. This second initial LUT may be associated to second K values. The first and second initial LUTs and the first and second K values may be created according to a specific criteria, e.g., by increasing the use of light colors for lower K values, and by reducing the use of light colors for higher K values.

At block 53, from the first and second initial LUTs, one single LUT 54 may be generated. The LUT 53 may map chromatic device color space vectors into NPacs, and may be the first LUT, e.g. LUT1, represented as 12 and 23, for example. Reference may be made to FIG. 3b: a first initial LUT may be chosen for $0 \leq K < K_1$, and a second initial LUT may be chosen for $K_1 \leq K \leq K_{MAX}$. The second initial LUT is shaped as the cube $30_1$ without the cube $30_{MAX}$ and the cube $30_1$ is also referred to as a hollow cube, and the first initial LUT has the volume of the cube $30_0$ without the volume of the cube $30_1$. By selecting the entries from the first and the second initial LUTs, the whole volume of the cube $30_0$ is covered. The resulting LUT may be understood as a piecewise-defined function, in which the domain is formed by juxtaposing the domains of the first and second initial LUTs using a specific criterion, such as the value K with respect to a threshold $K_1$. With reference to FIG. 3b, the domain of the resulting first LUT may be obtained by juxtaposing the volume associated to $0 \leq K < K_1$, to the volume associated to $K_1 \leq K \leq K_{MAX}$.

This technique may be implemented for mapping chromatic and achromatic devices color space vectors into NPacs in the presence of additional chromatic colorant, also referred to as light colorants, such as Orange, Violet, dilutions of light CMY colors, or additional light colors. e.g., light Cyan, light Magenta. CMY vectors expressed with {C, M, Y} may be mapped into NPacs with additional NPs, such as: C, M, Y, V, CM, CY, CV, MY, MV, YV, CMY, CYV, MYV and W, where V indicates Violet. For light chromatic values, the presence of an excessive Black quantity may be incompatible. For example, if it is intended to reduce grain, e.g., to reduce the visibility of different colorants in an image, the presence of a high value of Black may counterbalance the use of light colorants: the obtained image is seen by a human as having a high granularity. However, with method 50, different LUTs may be chosen for different intensities of Black: the initial LUT for $0 \leq K < K_1$ may be used for image areas in which light colorants are to be used, while the initial LUT associated to $K_1 \leq K \leq K_{MAX}$ may be used for image areas in which light colorants are not to be used. In examples, a user may choose the first and the second initial LUTs manually and may select a threshold value $K_1$ for delimiting the first and second initial LUTs, so that a first initial LUT is associated to values $0 \leq K < K_1$, while the second initial LUT is associated to values $K_1 \leq K \leq K_{MAX}$. There arises the possibility, for the user, of choosing several initial LUTs to form one single LUT in a similar fashion.

Therefore, the entries of the initial LUTs may be selected with reference to conditions associated to the achromatic device color space vectors.

Figure 6:
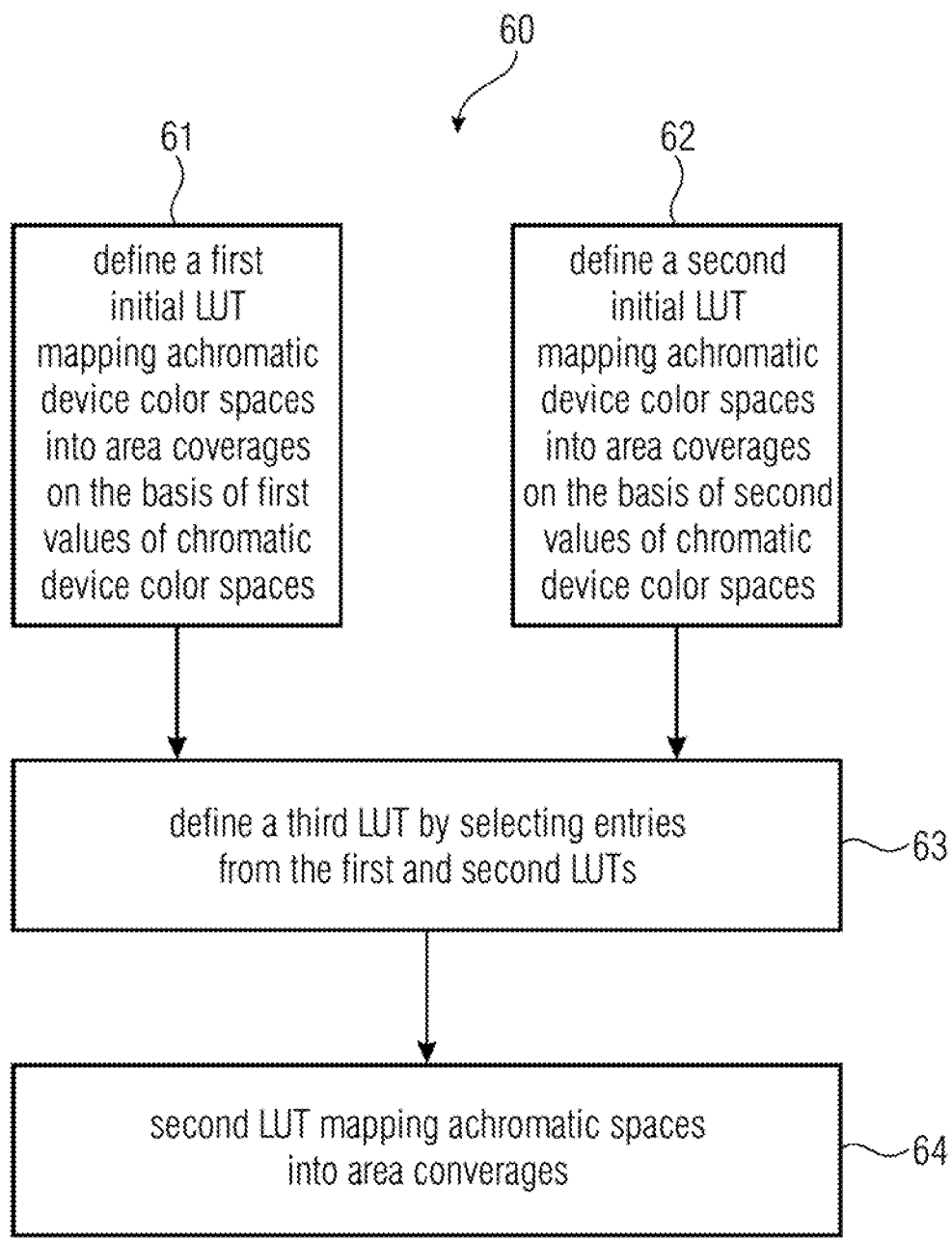
FIG. 6 shows a schematic diagram illustrating a method according to an example.

FIG. 6 shows a method 60. The method 60 may permit to create the second LUT, e.g., LUT2, mapping achromatic device color space vectors into NPacs. The second LUT may be defined from a first initial LUT and a second initial LUT. The first initial LUT may map achromatic device color space vectors into NPacs. The values of the first initial LUT are to be associated to first achromatic device color values, e.g., using criteria such as the comparison to a threshold, e.g., $C < C_1$, $M < M_1$ or the like). The second initial LUT may map chromatic device color space vectors into NPacs. The values of the second initial LUT are to be associated to second achromatic device color values, e.g., using criteria such as the comparison to a threshold, e.g., $C_1 \leq C$, $M_1 \leq M$ or the like. The first and second initial LUTs may be construed differently using different relationships between the colorant vectors and the NPacs.

The method 60 may comprise, for example, a block 61 defining a first initial LUT mapping achromatic device color space vectors into NPacs. This first initial LUT may be associated to a first group of values in the chromatic color space. The method 60 may comprise, for example, a block 62 defining a second initial LUT mapping achromatic device color space vectors into NPacs. This second initial LUT may be associated to a second group of values in the chromatic color space.

At block 63, the first and second initial LUTs may provide entries to define one single LUT 63. The LUT 63 may map achromatic device color space vectors into NPacs, which may be the second LUT, e.g. LUT2 represented as 14 and 23', for example.

Therefore, the second LUT may be understood as a piecewise-defined function, in which the domain is formed by juxtaposing the domains of the first and second initial LUTs using values of {C, M, Y} or {R, G, B} with which the values of the second LUT are to be combined.

Therefore, the entries of the initial LUTs may be selected with reference to conditions associated to the chromatic device color space vectors.

In one of the blocks 51, 52, 61, 62, a user may choose the first and/or the second initial LUTs manually and/or may select threshold conditions for using the initial LUTs. There arises the possibility, for the user, of choosing several LUTs to create one single LUT in a similar fashion.

Figure 7:
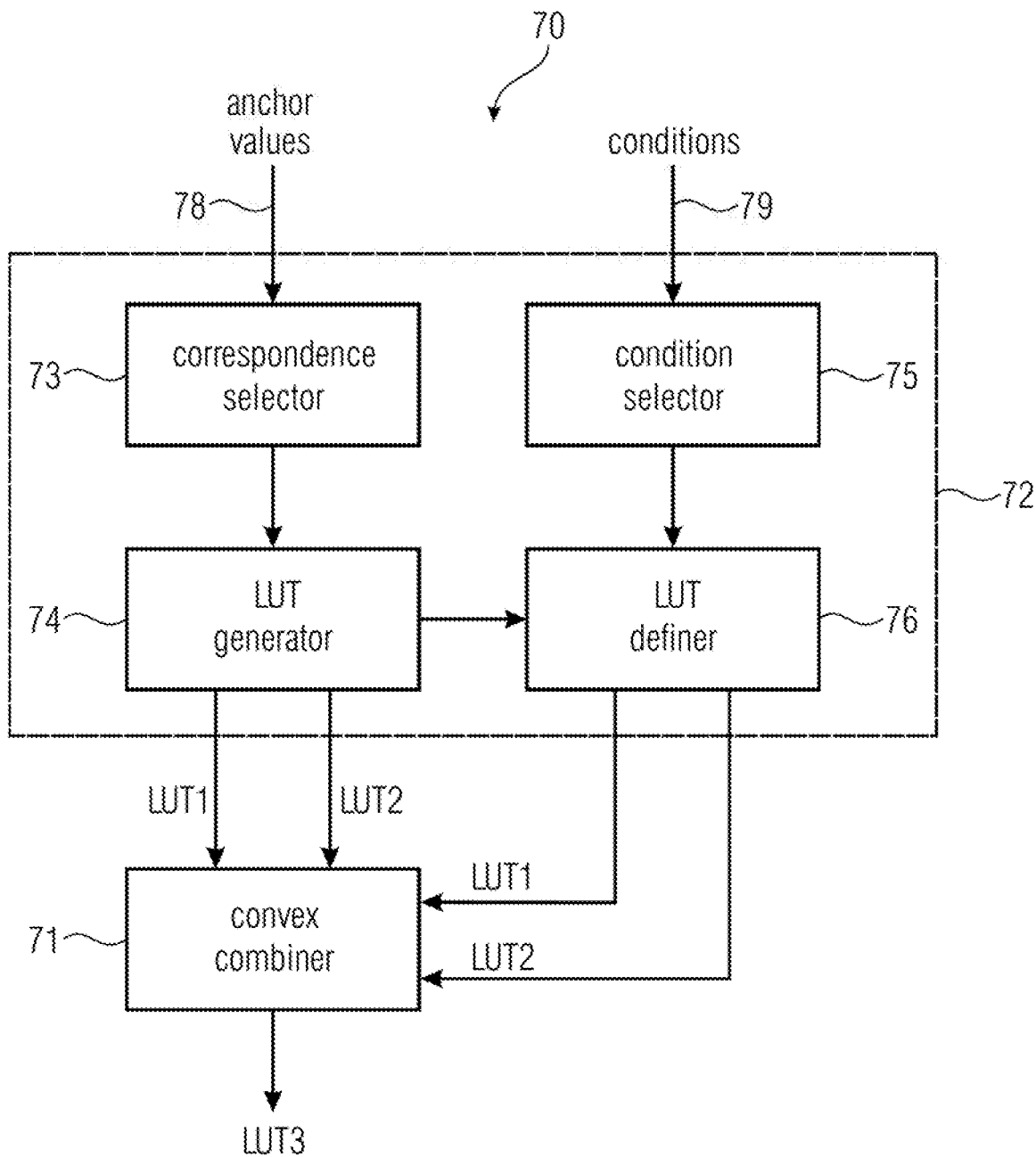
FIG. 7 shows a schematic diagram illustrating a system according to an example.

FIG. 7 shows a system 70 comprising a combiner 71 which generates a third LUT, e.g., LUT3, mapping chromatic and achromatic device color space vectors into NPacs from a first LUT, e.g., LUT1, mapping chromatic device color space vectors into NPacs and a second LUT. e.g., LUT2, mapping achromatic device color space vectors into NPacs. The combiner 71 may operate according to one of the methods 10, 20, or 40. In accordance with examples, the combiner may be a convex combiner. Other examples may use another combiner.

The combiner 71 may comprise circuitry, e.g., microprocessor-based circuitry, or circuitry executing instructions which may perform convex combinations between LUTs. For example, the combiner 71 may comprise logical equipment to perform operations on matrices, and in particular on elements of the matrices. The circuitry may, for example, calculate averages, e.g., averages using weights, between values in entries of the matrix.

The system 70 comprises a LUT generating device 72 which provides the LUT1 and the LUT2 to the combiner 71.

The LUT generating device 72 may comprise a correspondence, e.g., an anchor, selector 73. In examples, the correspondence selector 73 may operate according to block 22 or 22'. The correspondence selector 73 may be associated to an input 78 which permits the interaction with a user, so as to permit the user to select parameters. In examples, the correspondence selector 73 may be operated by a user, e.g., a color engineer, who may define anchor values, such as correspondences between chromatic or achromatic color values and NPacs, e.g., the user may define specific entries of LUTs, such as anchors. A correspondence may be defined by a user, for example, by choosing {C=0.5, M=0.25, Y=0.25} to correspond to {$NPac_C$=0.5, $NPac_M$=0.25, $NPac_Y$=0.25, $NPac_{CM}$=0, $NPac_{CY}$=0, $NPac_{MY}$=0, $NPac_{CMY}$=0, $NPac_W$=0}, for example.

The LUT generating device 72 may comprise a LUT generator 74. The LUT generator 74 may operate according to the block 16, 24, and/or the method 40, for example. The LUT generator 74 may generate a first and/or second LUT, e.g., either the first LUT mapping chromatic device color space vectors into NPacs or the second LUT mapping achromatic device color space vectors into NPacs. The LUT generator 74 may create a complete LUT using the correspondences selected by the user using the correspondence selector 73. The LUT generator 74 may therefore create LUTs, e.g., LUT1 and LUT2, which may be provided to the combiner 71.

In addition or instead, the LUT generating device 72 may comprise a LUT definer 76 which may operate according to the method 50 or 60. The LUT definer 76 may select entries from initial LUTs, which may be generated by the LUT generator 74, for example. The LUT definer 76 may operate using conditions 79 selected by a user, e.g., using a condition selector 75. For example, the LUT definer 76 may generate one single LUT mapping chromatic device color space vectors into NPacs from a first and a second initial LUTs mapping chromatic device color space vectors into NPacs by choosing the entries of the first initial LUT for $0 \leq K < K_1$, and the entries of the second initial LUT for $K_1 \leq K \leq K_{MAX}$ using the threshold K, selected by the user. Accordingly, the LUT definer 76 may provide the LUT1 and the LUT2 to the combiner 71. The LUT definer 76 may comprise circuitry in which memory locations may be associated to entries of matrices. In particular, the LUT definer 76 may define a third matrix by moving entries of a matrix into corresponding entries of another matrix. For example, the LUT definer 76 may copy data stored in memory locations associated to the entries of the first matrix into memory locations associated to entries of the second matrix.

Figure 8:
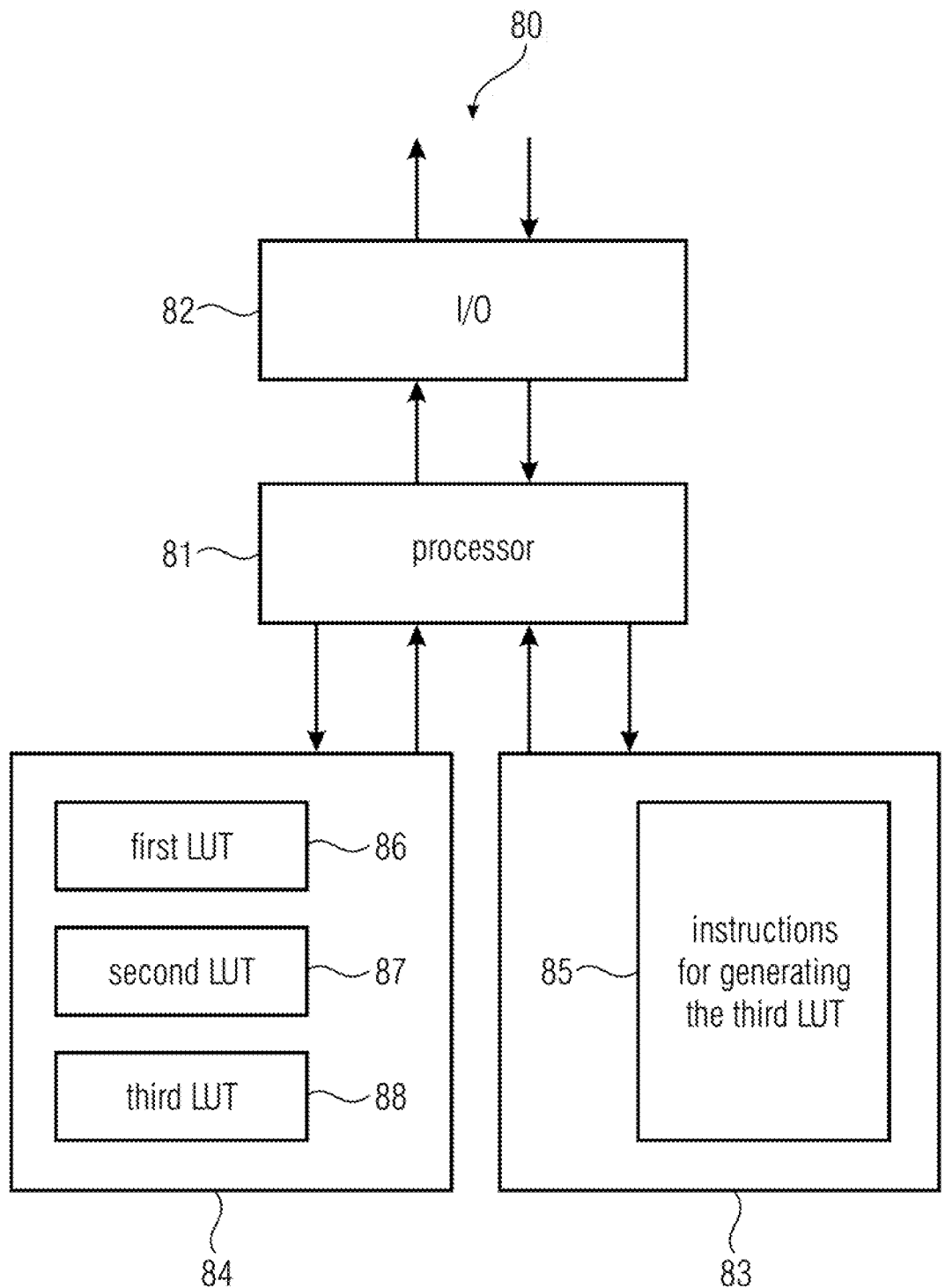
FIG. 8 shows a schematic diagram illustrating a system according to an example.

FIG. 8 shows a system 80 comprising a processor 81, an input/output (I/O) unit 82, and storage units 83 and 84. The system 80 may provide functionalities of the combiner 71 and/or the LUT generating device 72. The system 80 may exchange data with other systems, e.g., with remote systems, for example using a communication network. The system 80 may generate a third LUT mapping chromatic and achromatic device color space vectors into NPacs from a first LUT mapping chromatic device color space vectors into NPacs and a second LUT mapping achromatic device color space vectors into NPacs.

The storage unit 83 may comprise a non-transitory storage device 83 storing instructions 85 which, when executed by the processor 81, cause the processor to perform a convex combination between elements of the first LUT with elements of the second LUT. The instructions may cause the processor 81 to operate according to the method 10, 20, 40, 50, or 60.

The storage unit 84 may comprise volatile memory, e.g., flash memory, random access memory, RAM, etc., in which data 86, 87, and 88 are associated to the first, second and third LUTs, respectively.

Depending on certain implementations, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate or are capable of cooperating with a programmable computer system such that the respective method is performed. Therefore, the digital storage medium may be computer readable. The digital storage medium may be an example for the above mentioned storage unit.

Generally, examples may be implemented as a computer program product with program instructions, the program instructions for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a digital storage medium, or a computer-readable medium comprising, recorded thereon, the computer program for performing one of the methods described herein. The digital storage medium or the recorded medium are tangible and/or non-transitionary.

A further example comprises a processing unit, for example a computer, or a programmable logic device performing one of the methods described herein.

A further example comprises a computer having Installed thereon the computer program for performing one of the methods described herein.

A further example comprises an apparatus or a system transferring, for example, electronically or optically, a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device, for example, a field programmable gate array, may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

The invention claimed is:

1. A method comprising:
defining a first initial lookup table (LUT) that maps chromatic device color space vectors into NPacs to be associated to first achromatic device color values and a second initial LUT that maps chromatic device color space vectors into Neugebauer primary area coverage (NPacs) to be associated to second achromatic device color values;
defining a first LUT by selecting entries from the first initial LUT and the second initial LUT;
combining the first LUT that maps chromatic device color space vectors into the NPacs with a second LUT that maps achromatic device color space vectors into NPacs, to obtain a third LUT that maps chromatic and achromatic device color space vectors into NPacs; and
outputting the third LUT for an image processing pipeline of a printing system to generate hardcopy printed documents based on the third LUT.

2. The method of claim 1, wherein:
combining comprises averaging NPacs of the first LUT with NPacs of the second LUT.

3. The method of claim 1, wherein selecting entries comprises:
selecting entries of the first LUT from the first initial LUT and second initial LUT using a condition on the second achromatic device color values.

4. The method of claim 1, further comprising creating the second LUT by:
defining a first initial LUT the maps achromatic device color space vectors into NPacs to be associated to first chromatic device color values and a second initial LUT the maps achromatic device color space vectors into NPacs to be associated to second chromatic device color values; and
defining the second LUT by selecting entries from the first initial LUT and the second initial LUT.

5. The method of claim 4, wherein selecting entries comprises:
selecting entries of the second LUT from the first initial LUT and second initial LUT using a condition on the first chromatic device color values.

6. A system comprising:
a LUT generating device to provide a first lookup table (LUT) and a second LUT, the first LUT to map chromatic device color space vectors into Neugebauer primary area coverages (NPacs), and the second LUT to map achromatic device color space vectors into NPacs; and
a combiner to combine values of the LUT with values of the second LUT, to obtain a third LUT that maps chromatic and achromatic device color space vectors into NPacs,
wherein the LUT generating device is to generate the first LUT by defining a first initial LUT that maps chromatic device color space vectors into NPacs to be associated to first achromatic device color values and a second initial LUT that maps chromatic device color space vectors into NPacs to be associated to second achromatic device color values.

7. The system of claim 6, wherein:
the combiner comprises a convex combiner to perform a convex combination between values of the first and second LUT.

8. The system of claim 6, wherein:
the LUT generating device is to generate the second LUT by defining a first initial LUT that maps achromatic device color space vectors into NPacs to be associated to first chromatic device color values and a second initial LUT that maps achromatic device color space vectors into NPacs to be associated to second chromatic device color values.

9. A non-transitory processor readable storage medium comprising instructions that, when executed by the processor, cause the processor to:
combine values from entries of a first lookup table (LUT) that maps device color space vectors into Neugebauer primary area coverages (NPacs) with values from entries of a second LUT that maps device color space vectors into NPacs, to obtain a third LUT that maps device color space vectors into NPacs, wherein the first LUT includes values for a first portion of a device color space and the second LUT includes values for a second, different portion of the device color space;
output the third LUT for use by an image processing pipeline of a printing system to generate hardcopy printed documents based on the third LUT; and
generate the first LUT by defining a first initial LUT and a second initial LUT that map chromatic device color space vectors into NPacs according to a condition associated to values of the device color space.

10. The non-transitory processor readable storage medium of claim 9, further comprising instructions that, when executed by the processor, cause the processor to:
generate the second LUT by defining a first initial LUT and a second initial LUT that map achromatic device color space vectors into NPacs according to a condition associated to values of the device color space.

11. The non-transitory processor readable storage medium of claim 9, further comprising instructions that, when executed by the processor, cause the processor to:
combine values by averaging NPacs of the first LUT with NPacs of the second LUT.

12. The non-transitory processor readable storage medium of claim 9, wherein the first portion of the device color space is a chromatic portion of the device color space and the second, different portion of the device color space is an achromatic portion of the device color space.

13. The non-transitory processor readable storage medium of claim 9, wherein the first portion of the device color space includes a first range of K values within the device color space and the second, different portion of the device color space includes a second, different range of K values within the device color space.

14. The non-transitory processor readable storage medium of claim 13, wherein:
the first LUT provides increased use of light colors for the first range of K values, which is a lower end of a full range of K values; and
the second LUT provides decreased use of light colors for the second range of K values, which is a higher end of the full range of K values.

15. The non-transitory processor readable storage medium of claim 9, further comprising instructions that, when executed by the processor, cause the processor to combine the values by a convex combination of the values of the first and second LUTs.

16. The non-transitory processor readable storage medium of claim 9, further comprising instructions that, when executed by the processor, cause the processor to combine the values with a different weight assigned to each of the first LUT and second LUT.

17. The non-transitory processor readable storage medium of claim 9, further comprising instructions that, when executed by the processor, cause the processor to combine the values using an iterative cycle.

* * * * *